July 24, 1923.

B. W. HURD

BALL BEARING

Filed July 20, 1921

1,462,965

WITNESSES:
Edgar Vogel
Hattie Cohen

INVENTOR.
Benjamin W. Hurd.

Patented July 24, 1923.

1,462,965

UNITED STATES PATENT OFFICE.

BENJAMIN W. HURD, OF SAN FRANCISCO, CALIFORNIA, ASSIGNOR TO TURBINE FUEL OIL BURNER CO., OF SAN FRANCISCO, CALIFORNIA, A CORPORATION OF NEVADA.

BALL BEARING.

Application filed July 20, 1921. Serial No. 486,203.

*To all whom it may concern:*

Be it known that I, BENJAMIN W. HURD, a citizen of the United States, residing at San Francisco, in the county of San Francisco and State of California, have invented a new and useful Improvement in Ball Bearings, of which the following is a specification.

This invention relates to improvements in ball bearings of the radial type which are designed to carry a thrust as well as a radial load and more particularly to the type of ball bearing known as the Norma type; that is open on one side so the inner race with the balls may be easily separated from the outer ball race.

Ball bearings as they are made at the present time; the balls are held in a container which revolves with the balls and is a separator as well as a retainer, the rolling action of the balls wears this separating part and allows the balls to get out of place, jamming the bearing; the object of this invention is to make a retainer which will hold the balls when the bearing is taken apart, but which will not touch the balls when the bearing is completely assembled, and one that the retaining members are firmly fastened to the inside race so there will be no shifting of weight at high speeds, as happens with the present bearings.

The ball bearing which is illustrated as an embodiment of the invention has an inside ball race to which are fastened two concave-convex washers, an outer ball race, and balls to fill the space between the outer and inner races; the washers inclosing the balls are close enough at their largest diameters so that the balls can not get through, but are dished enough so the balls are free when they are in place.

Figure 1:
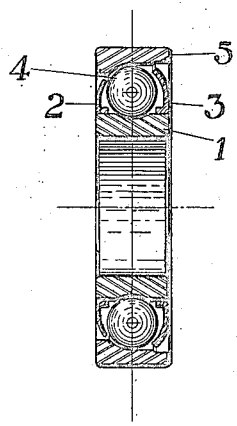

Fig. 1, of the accompanying drawings is a section on line A—A' showing inner ball race 1, large retainer disc 3, small retainer disc 2, balls 4, and outer race 5.

Figure 2:
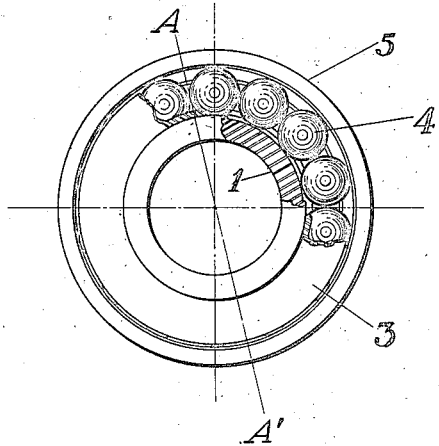

Fig. 2, is an elevation, partly broken away, looking at the open end of the bearing. To assemble, the discs 2—3, are pressed on to the inside race 1; the balls 4, are then forced between the discs 2 and 3, until the race 1, is full, there being spring enough in the discs 2 and 3, to allow the balls to snap in.

The invention claimed is:

1. The combination, in a ball bearing, of two discs firmly mounted on the inner ball race to retain the balls when the bearing is disassembled, but which do not touch the balls when the bearing is assembled in connection with an outer ball race and balls.

2. The combination, in a ball bearing, of two duplicate discs of different diameters mounted on the inner race of an open side ball bearing, the opening between the outer diameters of the discs being less than the diameter of the balls in the bearing, and the opening between the discs at their smallest diameter being greater than the balls, to allow free movement of the balls when they are in running position, in connection with an outer ball race and balls.

3. The combination, in a ball bearing, of two concave-convex discs of the same inner diameter but of different outer diameters, firmly mounted on the inner race of an open side, ball bearing and so adjusted as to allow free movement of the balls when in running position, but to retain or hold the balls when separated from the outer race, in connection with an outer race and balls to fill between inner and outer races, substantially as described.

BENJAMIN W. HURD.

Witnesses:
 EDGAR G. VOGEL,
 HATTIE COHEN.